United States Patent
Arai et al.

(10) Patent No.: US 9,961,460 B2
(45) Date of Patent: May 1, 2018

(54) VIBRATION SOURCE ESTIMATION DEVICE, VIBRATION SOURCE ESTIMATION METHOD, AND VIBRATION SOURCE ESTIMATION PROGRAM

(71) Applicant: NEC Corporation, Tokyo (JP)

(72) Inventors: Yumi Arai, Tokyo (JP); Yuzo Senda, Tokyo (JP); Osamu Hoshuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 84 days.

(21) Appl. No.: 14/967,724

(22) Filed: Dec. 14, 2015

(65) Prior Publication Data

US 2016/0171965 A1 Jun. 16, 2016

(30) Foreign Application Priority Data

Dec. 16, 2014 (JP) .................................. 2014-254263

(51) Int. Cl.
*H04R 29/00* (2006.01)
*G01S 5/22* (2006.01)

(52) U.S. Cl.
CPC ............... *H04R 29/00* (2013.01); *G01S 5/22* (2013.01); *H04R 2430/23* (2013.01)

(58) Field of Classification Search
CPC .. H04R 29/00; H04R 29/005; H04R 2430/20; H04R 2430/21; H04R 2430/23; G01S 5/22
USPC ...................................................... 381/56, 92
See application file for complete search history.

(56) References Cited

U.S. PATENT DOCUMENTS

| 5,526,433 | A | * | 6/1996 | Zakarauskas | .......... H04R 1/406 367/104 |
| 2002/0048376 | A1 | * | 4/2002 | Ukita | ....................... H04N 7/15 381/92 |
| 2006/0245601 | A1 | * | 11/2006 | Michaud | ................... G01S 5/22 381/92 |

FOREIGN PATENT DOCUMENTS

| JP | 5-87903 | 4/1993 |
| JP | 2004-12151 | 1/2004 |

* cited by examiner

*Primary Examiner* — Jason R Kurr
(74) *Attorney, Agent, or Firm* — Finnegan, Henderson, Farabow, Garrett & Dunner, L.L.P.

(57) ABSTRACT

A vibration source estimation device, method and computer-readable medium are provided. The vibration source estimation device comprises a processor configured to execute instructions to receive data samples of a plurality of vibration signals generated at a vibration position, the data samples being associated with a plurality of frames. The processor is also configured to execute instructions to calculate a cross correlation function for each frame based on the data samples, calculate a weight for each frame based on a signal-to-noise ratio calculated from the cross correlation function, multiply the cross correlation function for each frame by the weight, calculate a sum of weighted cross correlation functions for respective frames as a weighted-cross-correlation function, and estimate the vibration position based on the weighted-cross-correlation function.

17 Claims, 6 Drawing Sheets

VIBRATION SOURCE ESTIMATION DEVICE, VIBRATION SOURCE ESTIMATION METHOD, AND VIBRATION SOURCE ESTIMATION PROGRAM

CROSS-REFERENCE TO RELATED APPLICATIONS

This application claims priority from Japanese Patent Application No. 2014-254263, filed on Dec. 16, 2014. The disclosure of the above-reference application is incorporated herein by reference in its entirety.

BACKGROUND

Technical Field

The present disclosure generally relates to devices, methods, and software programs for estimating the positions of a vibration source.

Description of the Related Art

Methods for estimating vibration sources, as typified by a sound source, using sensors may be widely known. There may be a method in which the position of a sound source is estimated using the difference between the arrival times of sound reception signals that are received by two microphones as a typical method for estimating the position of the sound source. In this method, a cross correlation function may be calculated using samples of the sound signals received by the two microphones. The cross correlation function can be a function of a time difference, and a value of time difference that maximizes the value of the cross correlation function may be calculated as the difference between the arrival times of the sound wave. The difference in arrival time can be used to estimate the arrival direction θ of the sound wave.

There may also be a method for estimating the position of a sound source in consideration of the effects of noises and reflected sounds. In a sound source direction estimation method, in a case where reflected sounds are loud, only direct sounds, which arrive at microphones before the reflected sounds arrive at the microphones, are set to be measuring objects, so that the direction of a sound source is estimated on the basis of acoustic signals extracted during a short time period. In some aspects, in the sound source direction estimation method, in a case where noises are loud, the direction is estimated on the basis of acoustic signals extracted during a long time period, in which both direct sounds and reflected sounds are generated simultaneously, in order to obtain as many samples as possible.

There may also be a sound source direction estimation method in which the direction of a sound source is estimated in an acoustic field where many reflected sounds exist. In the sound source direction estimation method, plural signals may be generated by performing peak-hold processing on respective outputs of plural microphones, and a cross correlation function may be calculated on the basis of the processed plural signals.

In the above-described methods, peak-hold processing is performed, and subsequent reflected sounds are masked by the peak-hold processing. In some aspects, in the above-described methods, a cross correlation function may be calculated on the basis of signals on which the peak-hold processing is performed, therefore information included in the original acoustic signals may not be fully utilized.

In some aspects, in the sound source direction estimation method, there may be a problem in that the estimation accuracy is lowered in a case where both reflected sounds and noises are loud.

SUMMARY OF THE DISCLOSURE

Exemplary embodiments of the present disclosure overcome the above disadvantages and other disadvantages not described above. Also, the present exemplary embodiments are not required to overcome the disadvantages described above, and an exemplary embodiment of the present disclosure may not overcome any of the problems described above.

According to embodiments of the present disclosure, there is provided a vibration source estimation device including a memory storing instructions, and at least one processor configured to process the instructions to receive data samples of a plurality of vibration signals generated at a vibration position, the data samples being associated with a plurality of frames, calculate a cross correlation function for each frame using the data samples, calculate a weight for each frame on a basis of a signal-to-noise ratio calculated from the cross correlation function, multiply the cross correlation function for each frame by the weight, calculate a sum of weighted cross correlation functions for respective frames as a weighted-cross-correlation function, and estimate the vibration position based on the weighted-cross-correlation function.

According to embodiments of the present disclosure, there is provided a vibration source estimation method performed by at least one processor. The method may include receiving data samples of a plurality of vibration signals generated at a vibration position, the data samples being associated with a plurality of frames, calculating a cross correlation function for each frame using the data samples, calculating a weight for each frame on a basis of a signal-to-noise ratio calculated from the cross correlation function, multiplying the cross correlation function for each frame by the weight, calculating a sum of weighted cross correlation functions for respective frames as a weighted-cross-correlation function, and estimating the vibration position based on the weighted-cross-correlation function.

According to embodiments of the present disclosure, there is provided a non-transitory computer-readable storage medium having stored thereon instructions that when executed by a computer enable the computer to implement a method. The method may include receiving data samples of a plurality of vibration signals generated at a vibration position, the data samples being associated with a plurality of frames, calculating a cross correlation function for each frame using the data samples, calculating a weight for each frame based on a signal-to-noise ratio calculated from the cross correlation function, multiplying the cross correlation function for each frame by the weight, calculating a sum of weighted cross correlation functions for respective frames as a weighted-cross-correlation function, and estimating the vibration position based on the weighted-cross-correlation function.

BRIEF DESCRIPTION OF DRAWINGS

Aspects of exemplary embodiments will be more apparent by describing certain exemplary embodiments with reference to the accompanying drawings, in which.

DETAILED DESCRIPTION

The following description of illustrative, non-limiting embodiments discloses specific configurations, components, and processes. However, the embodiments are merely examples, and thus, the specific features described below are merely used to more easily describe such embodiments and to provide an overall understanding. Accordingly, one skilled in the art will readily recognize that the present invention is not limited to the specific embodiments described below. Furthermore, the descriptions of various configurations, components, and processes of the embodiments that would have been known to one skilled in the art are omitted for the sake of clarity and brevity.

FIRST EXAMPLE

Figure 1:
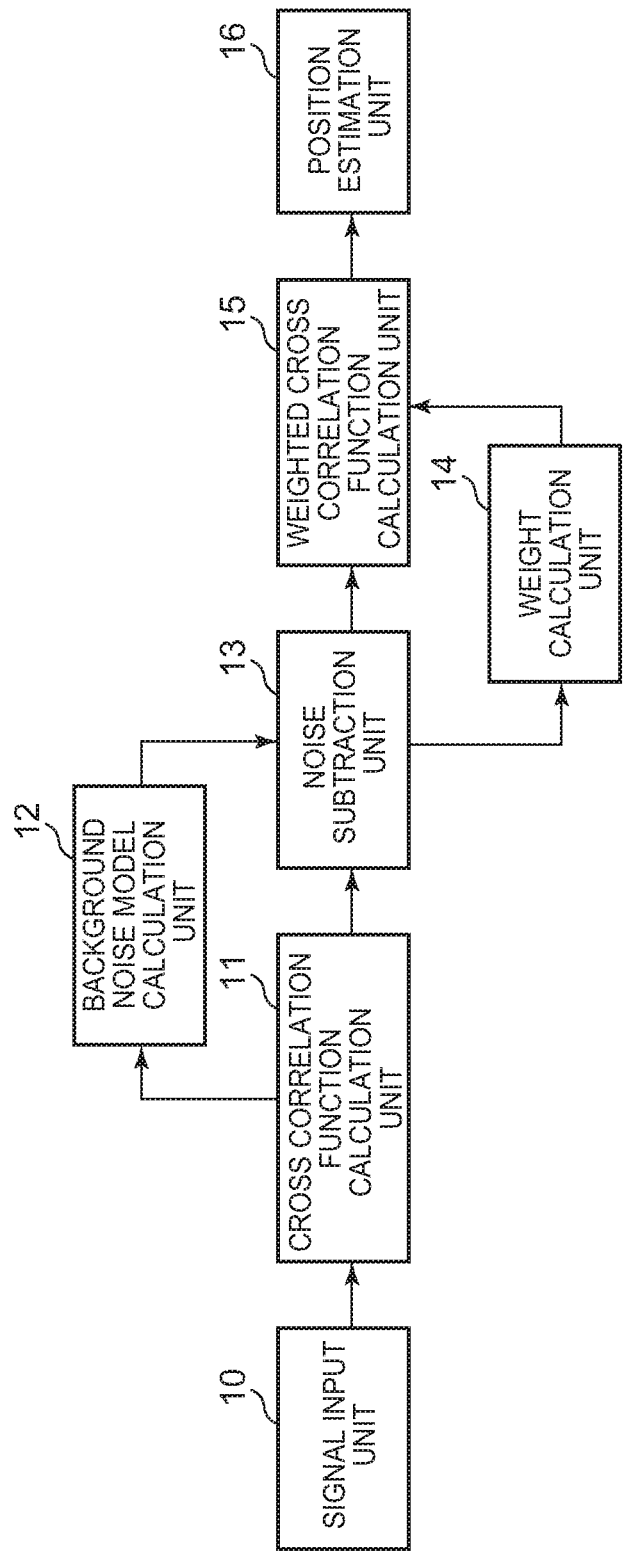
FIG. 1 is a block diagram illustrating an exemplary vibration source estimation device according to embodiments of the present disclosure.

FIG. 1 is a block diagram illustrating an exemplary vibration source estimation device. The vibration source estimation device may include a signal input unit 10, a cross correlation function calculation unit 11, a background noise model calculation unit 12, a noise subtraction unit 13, a weight calculation unit 14, a weighted cross correlation function calculation unit 15, and a position estimation unit 16.

The signal input unit 10 may input in vibration signals measured by plural sensors. In the following description, the vibration signals are illustrated by signals measured by microphones. The signal input unit 10 of this present exemplary embodiment may input in a signal $x_1(t)$ and a signal $x_2(t)$ measured constantly by a microphone array which includes two microphones which are installed indoors, where t denotes a sample number. In the following description, a microphone may be referred as a MIC.

The cross correlation function calculation unit 11 may calculate a sequential cross correlation function of a MIC signal $x_1(t)$ and a MIC signal $x_2(t)$ for every predetermined number of samples (to be referred to as a frame hereinafter). The predetermined number of samples may be denoted by T.

The current frame number may be denoted by k. The cross correlation function calculation unit 11 may calculate the cross correlation function of the k-th frame as a function of the number of lag samples $\tau_s$ using the following Expression 1. In Expression 1, $t_k$ may denote the start sample number of the k-th frame.

$$c(k, \tau_s) = \frac{1}{T} \sum_{t=t_k}^{t_k+T-1} x_1(t)x_2(t + \tau_s) \quad \text{(Expression 1)}$$

The cross correlation function calculation unit 11 may calculate the cross correlation function by applying a window function or using FFT (fast Fourier transform) in advance so that the cross correlation function becomes equivalent in the frequency domain.

In some aspects, the cross correlation function calculation unit 11 may adopt a cross correlation function that is obtained by transforming $c(k, \tau_s)$ in Expression 1 into a complex number instead of the cross correlation function that is obtained using the above-described Expression 1 (refer to the following Expression 2). In other aspects, the cross correlation function calculation unit 11 may adopt the absolute value of a complex number given by the following Expression 2 (refer to the following Expression 3).

$$c(k,\tau_s) \rightarrow c(k,\tau_s) + jH(c(k,\tau_s)) \quad \text{(Expression 2)}$$

$$c(k,\tau_s) \rightarrow |c(k,\tau_s) + jH(c(k,\tau_s))| \quad \text{(Expression 3)}$$

In Expression 2 and Expression 3, j may denote an imaginary unit, and $H(c(k, \tau_s))$ may be a function obtained by performing Hilbert transformation on $c(k, \tau_s)$. In the estimation of the direction of a sound source, the number of lag samples $\tau_s$ may correspond to the direction of the sound source.

Figure 2:
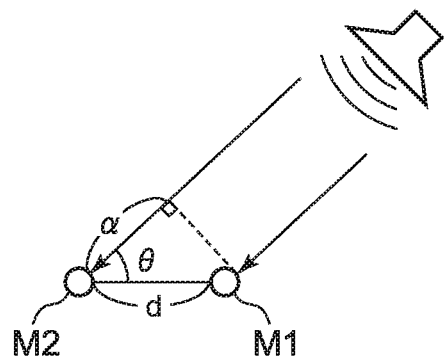
FIG. 2 is a diagram illustrating an example of the positional relation of two microphones and a sound source that can be determined using embodiments of the present disclosure.

FIG. 2 is an explanatory diagram illustrating an example of the positional relation of two MICs and a sound source. A transmission time difference τ between the transmission times of a sound wave to a MIC M1 and a MIC M2 may be time for the sound wave to travel a distance α illustrated in FIG. 2. In some aspects, the transmission time difference τ may be given by the following Expression 4 as a function of a distance d between the MICs, the velocity of sound v, and the direction θ of the sound source.

$$\tau = \frac{\alpha}{v} = \frac{d\cos\theta}{v} \quad \text{(Expression 4)}$$

The relation between the transmission time difference τ and the number of lag samples $\tau_s$ may be given the following Expression 5 using a sampling frequency $f_s$.

$$\tau = \frac{\tau_s}{f_s} \quad \text{(Expression 5)}$$

The value of θ may range from 0 degree to 180 degrees. Therefore, the range of $\tau_s$ may be given by the following Expression 6 using the above-described Expressions 4 and 5.

$$-\frac{df_s}{v} \leq \tau_s \leq \frac{df_s}{v} \quad \text{(Expression 6)}$$

In some aspects, the cross correlation function calculation unit 11 may calculate the terms of the right-hand side of Expression 2 and the terms of the right-hand side of Expression 3. In such a case, more stable correlation detection, which is unlikely to be influenced by a minute change of a vibration transmission system, can be performed.

In the following description, a period for the past l frames from the current frame k to the frame k−l+1 may be used as an evaluation target period [k−l+1, k]. The number of frames l may be set longer than a time period from the time when a direct sound from a target sound source is measured to the time when the corresponding reflected sound first reaches a sensor (MIC), and at a maximum to a time period to the time when the relevant reverberation converges. The number of the frames may be set on the basis of, for example, the reverberating time of a room or an application.

The background noise model calculation unit 12 may generate a background noise model which models a stable noise, using cross correlation functions for m frames that are calculated by the cross correlation function calculation unit 11. In some aspects, the background noise model calculation unit 12 may use the cross correlation functions for m frames which are frames earlier than the frames during the evaluation target period as a background noise model generation period [k−l−m+1, k−l]. In some aspects, this background noise model generation period may be a period used when a stable noise (background noise) is modeled.

The number m of the frames may be set adequately longer than the duration of a burst noise in order to suppress the influence of the burst noise on the background noise model. The evaluation target period and the background noise model generation period may be separated from each other in the above description. In some aspects, they may not be separated from each other. If m is adequately large, the evaluation target period and the background noise model generation period may overlap each other during a period of the past l frames from the current frame k to the frame k−l+1.

The background noise model calculation unit 12 may generate a background noise model calculating the average value $C_b(\tau_s)$ and the standard deviation $\sigma_b(\tau_s)$ of the cross correlation functions using, for example, the following Expression 7 and Expression 8.

$$C_b(\tau_s) = \frac{1}{m} \sum_{i=k-l-m+1}^{k-l} c(i, \tau_s) \quad \text{(Expression 7)}$$

$$\sigma_b(\tau_s) = \sqrt{\frac{1}{m} \sum_{i=k-l-m+1}^{k-l} |c(i, \tau_s) - C_b(\tau_s)|^2} \quad \text{(Expression 8)}$$

Although both $C_b(\tau_s)$ denoted in Expression 7 and $\sigma_b(\tau_s)$ denoted in Expression 8 are functions of k, k may be omitted in $C_b(\tau_s)$ and $\sigma_b(\tau_s)$ for simplicity of description.

In some aspects, the background noise model calculation unit 12 may calculate the exponentially weighted moving average values of the cross correlation functions and the standard deviation of the cross correlation functions instead of the average value of the cross correlation functions and the standard deviation of the cross correlation functions.

The noise subtraction unit 13 may subtract a background noise component from cross correlation functions for l frames calculated by the cross correlation function calculation unit 11 using the background noise model calculated by the background noise model calculation unit 12. Hereinafter, a function obtained by subtracting the background noise component from a cross correlation function will be described as a noise-subtracted cross correlation function. The noise subtraction unit 13 may calculate a noise-subtracted cross correlation function $c_f(i, \tau_s)$ for a frame with its frame number i using, for example, the following Expression 9, where k−l+1≤i≤k.

$$c_f(i,\tau_s)=0 \text{ (if } |c(i,\tau_s)-C_b(\tau_s)|<s\sigma_b(\tau_s))$$

$$c_f(i,\tau_s)=c(i,\tau_s)-C_b(\tau_s) \text{ (otherwise)} \quad \text{(Expression 9)}$$

In Expression 9, s may be a real number 0 or larger. Expression 9 may mean that, in a case where s becomes larger, components of the cross correlation function which are more largely apart from the background noise remain. If the direction of a low target sound is estimated using the cross correlation function, s may be set small.

The weight calculation unit 14 may calculate a weight for each frame on the basis of a signal-to-noise ratio (an SNR) calculated from the noise-subtracted cross correlation function. In some aspects, the weight calculation unit 14 may calculate a weight w(i) for the i-th frame so that, in the case where the signal-to-noise ratio of the noise-subtracted cross correlation function for the i-th frame is higher, the weight w(i) is set larger, where k−l+1≤i≤k.

A signal in this disclosure may indicate a direct sound. Noises in this disclosure may include reflected sounds and burst noises that cannot be represented by any background noise model.

The weight calculation unit 14 may calculate the weights using a simple method such as a method in which, if an SNR is larger than a predetermined threshold, w(i) may be set to 1, and if the SNR is equal to the predetermined threshold or smaller, w(i) may be set to 0. The weight calculation unit 14 may calculate a weight that is proportional to the SNR using, for example, the following Expression 10.

$$w(i)=h \times SN(i) \quad \text{(Expression 10)}$$

In Expression 10, h may be a real number equal to 0 or larger. The weight calculation unit 14 may determine h so as to satisfy, for example, the following Expression 11.

$$\sum_{i=k-l+1}^{k} w(i)=1 \quad \text{(Expression 11)}$$

In Expression 10, SN(i) may represent an SNR. The weight calculation unit 14 may calculate SN(i) using, for example, the following Expression 12.

$$SN(i) = \frac{\max_{\tau_s} \{|c_f(i, \tau_s)|\}^2}{\sum_{\tau_s} |c_f(i, \tau_s)|^2} \quad \text{(Expression 12)}$$

The weight calculation unit 14 may calculate the weight as an exponentiation of the right-hand side of the above-described Expression 10 using the following Expression 13.

$$w(i)=\{h \times SN(i)\}^p \quad \text{(Expression 13)}$$

The weighted cross correlation function calculation unit 15 may calculate a weighted-cross-correlation function by multiplying the cross correlation functions which are calculated by the noise subtraction unit 13 (that is, the noise-subtracted cross correlation functions) by the respective weights calculated by the weight calculation unit 14. In some aspects, the weighted cross correlation function calculation unit 15 may multiply a cross correlation function for each frame by the relevant weight. The weighted cross correlation function calculation unit 15 may calculate the summation of the weighted cross correlation functions for respective frames as a weighted-cross-correlation function. The weighted cross correlation function calculation unit 15 may calculate the weighted-cross-correlation function using, for example, the following Expression 14.

$$c_w(k,\tau_s)=\Sigma_{i=k-l+1}^{k} w(i) c_i(i,\tau_s) \qquad \text{(Expression 14)}$$

The position estimation unit 16 may estimate the position of a sound source that is a vibration source on the basis of the calculated weighted-cross-correlation function. For example, in a case where the weighted-cross-correlation function denoted by the above-described Expression 14 is calculated, the position estimation unit 16 may estimate the direction θ of the sound source from the following Expression 15 using the number of lag samples $\tau_s$ $(=\Gamma_s)$ that makes the weighted-cross-correlation function $c_w(k, \tau_s)$ the maximum, or, equal to or larger than a threshold value.

$$\theta = \arccos \frac{v\Gamma_s}{d} \qquad \text{(Expression 15)}$$

The signal input unit 10, the cross correlation function calculation unit 11, the background noise model calculation unit 12, the noise subtraction unit 13, the weight calculation unit 14, the weighted cross correlation function calculation unit 15, and the position estimation unit 16 may be realized by the CPU (Central Processing Unit) of a computer or a digital signal processor that runs in accordance with a software program. The processor can be configured by the software program to compute one or more values associated with the expressions.

For example, the software program may be stored in a memory unit of the vibration source estimation device. The CPU may read in the program, and the CPU may operate as the signal input unit 10, the cross correlation function calculation unit 11, the background noise model calculation unit 12, the noise subtraction unit 13, the weight calculation unit 14, the weighted cross correlation function calculation unit 15, and the position estimation unit 16 in accordance with the software program. The processor can be configured by the software program to compute one or more values associated with the expressions.

In some aspects, the signal input unit 10, the cross correlation function calculation unit 11, the background noise model calculation unit 12, the noise subtraction unit 13, the weight calculation unit 14, the weighted cross correlation function calculation unit 15 and the position estimation unit 16 may be realized by respective dedicated hardware devices.

Figure 3:
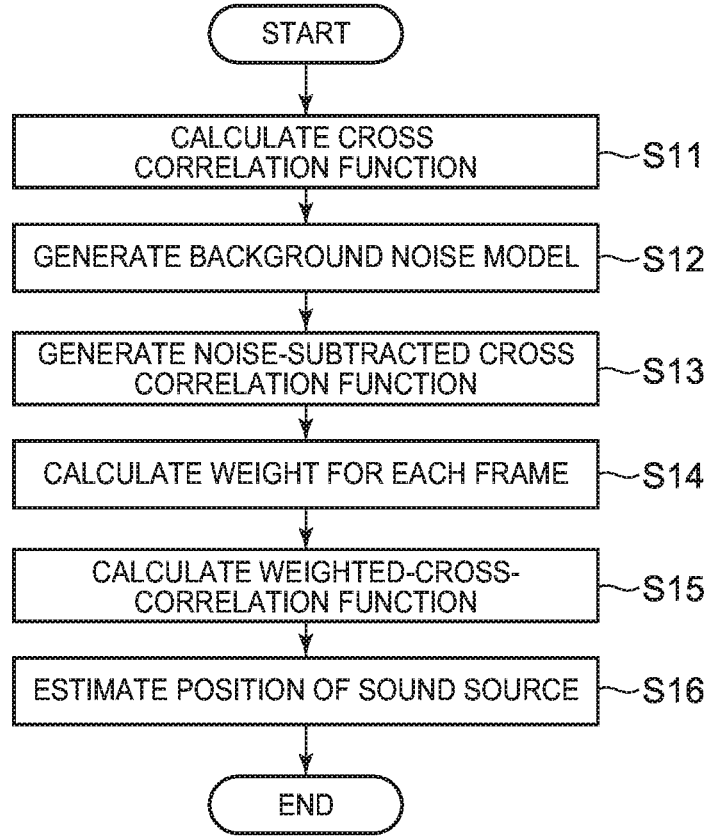
FIG. 3 is a flowchart illustrating an exemplary vibration source estimation method according to embodiments of the present disclosure.

FIG. 3 is a flowchart illustrating an exemplary method for vibration source estimation device. In some embodiments, the exemplary method of FIG. 3 can be performed by the exemplary vibration source estimation device of FIG. 1.

In step S11, the cross correlation function calculation unit 11 may calculate a cross correlation function for each frame using input signals. In step S12, the background noise model calculation unit 12 may generate a background noise model using the cross correlation function calculated by the cross correlation function calculation unit 11. In step S13, the noise subtraction unit 13 may generate a noise-subtracted cross correlation function by subtracting a background noise component from the cross correlation function calculated by the cross correlation function calculation unit 11 using the background noise model calculated by the background noise model calculation unit 12.

In step S14, the weight calculation unit 14 may calculate a weight for each frame on the basis of a signal-to-noise ratio calculated from the noise-subtracted cross correlation function. In step S15, the weighted cross correlation function calculation unit 15 may calculate a weighted-cross-correlation function by multiplying the noise-subtracted cross correlation function by the calculated weight. In step S16, the position estimation unit 16 may estimate the position of the sound source on the basis of the calculated weighted-cross-correlation function.

As described above, in some embodiments, the cross correlation function calculation unit 11 may calculate a cross correlation function for each frame from vibration signals. In some aspects, the background noise model calculation unit 12 may calculate a background noise model from the cross correlation function, and the noise subtraction unit 13 may calculate a noise-subtracted cross correlation function by subtracting a background noise specified by the background noise model from the cross correlation function. In some aspects, the weight calculation unit 14 may calculate a weight for each frame on the basis of a signal-to-noise ratio calculated from the noise-subtracted cross correlation function. The weighted cross correlation function calculation unit 15 may multiply the noise-subtracted cross correlation function for each frame by the relevant calculated weight, and calculate the summation of the weighted noise-subtracted cross correlation functions for respective frames as a weighted-cross-correlation function. The position estimation unit 16 may estimate the position of a vibration source on the basis of the weighted-cross-correlation function.

Owing to the above-described configuration, the position of a sound source of a target sound can be precisely estimated even in environments where both reflected sounds and noises are loud. In some aspects, the position of a target vibration source can be precisely estimated even in environments where vibrations are transmitted by reflections or environments where vibrations are generated from various vibration sources other than the target vibration source. As described in embodiments of the present disclosure, by weighting in temporal direction, a higher weight may be given to a time period during which fewer reflected sounds exist. As a result, reflected sounds may be prevented from being erroneously detected, and the direction of a direct sound can be accurately estimated.

In some embodiments, the weighted cross correlation function calculation unit 15 may calculate a weighted-cross-correlation function in such a way that a frame including a louder direct sound in comparison with reflected sounds (that is, a frame having a larger SNR) is given a larger weight when a cross correlation function between two MIC signals is calculated. Therefore, even if data during a comparatively long time period is used, the influence of erroneous estimation owing to reflected sounds can be suppressed. Therefore, in environments where both noises and reflected sounds are loud, the position of a sound source can be more precisely estimated.

In the description above, illustrative examples MICS being adopted as sensors and sounds being adopted as signals are provided. However, the contents of the sensor and the signal may not be limited to a MIC and a sound respectively. For example, a vibration sensor or an antenna may be used as the sensor. In some aspects, the band of the signal may be not only a band in the audible range but also a band beyond the audible range. The above-described features may also be similar to the descriptions of the following examples.

SECOND EXAMPLE

Figure 4:
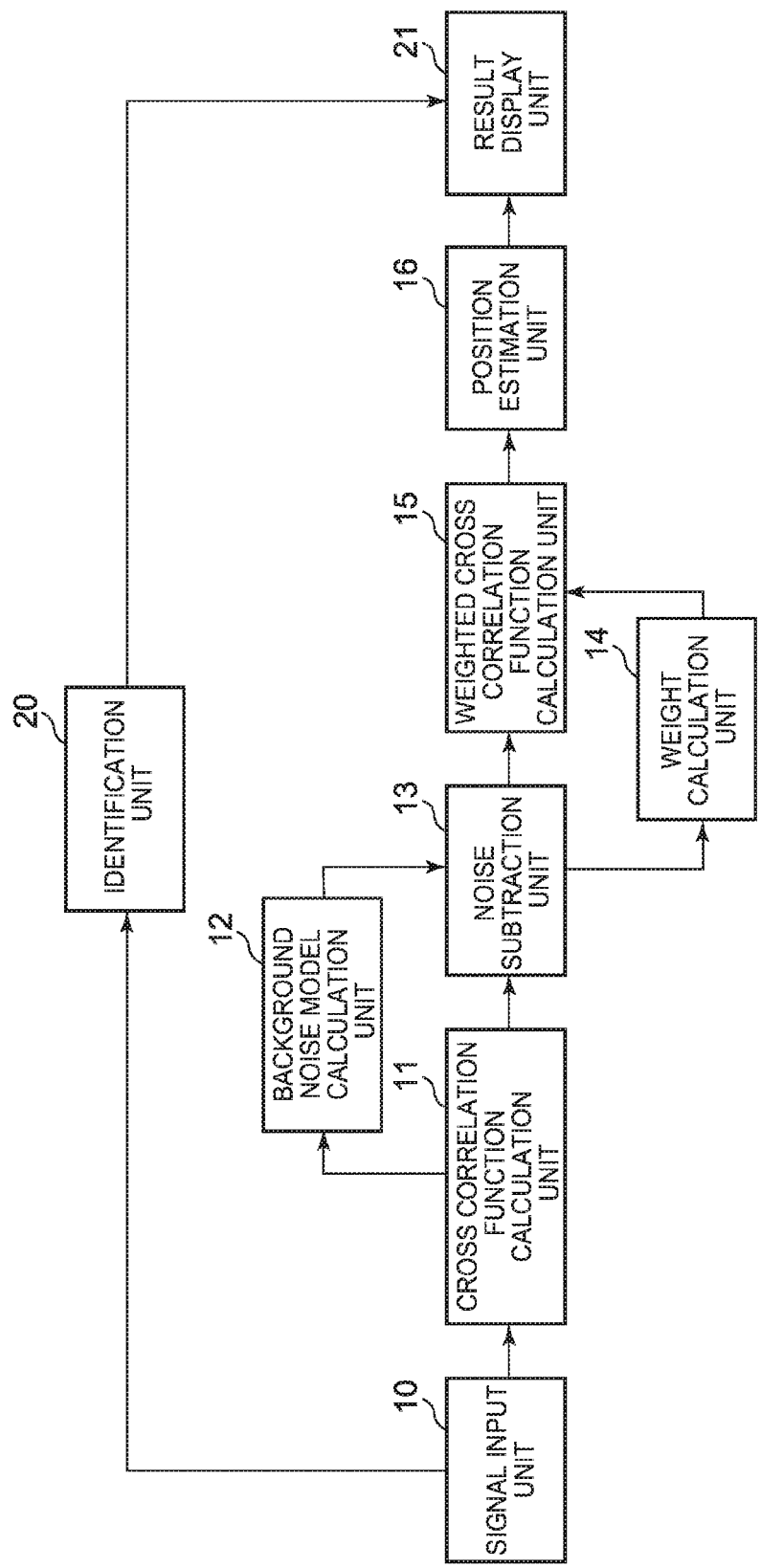
FIG. 4 is a block diagram illustrating an exemplary vibration source estimation device according to embodiments of the present disclosure.

FIG. 4 is a block diagram illustrating an exemplary vibration source estimation device. Components that are the same as those of the first example are given the same reference symbols illustrated in FIG. 1.

The exemplary vibration source estimation device of FIG. 4 may include a signal input unit 10, a cross correlation function calculation unit 11, a background noise model calculation unit 12, a noise subtraction unit 13, a weight calculation unit 14, a weighted cross correlation function calculation unit 15, a position estimation unit 16, an identification unit 20, and a result display unit 21.

The identification unit 20 may identify a kind of event (e.g., an acoustic event) on the basis of a sound included in a signal, using the signal input by the signal input unit 10. Examples of an acoustic event may include, a scream, a gunshot, a crushing sound of glass, a breaking sound, or the like. The identification unit 20 may calculate an identification result on the basis of the degree of similarity between an acoustic event model learned from plural sample sounds and an acoustic signal input by the signal input unit 10. A method, in which a specific event is detected on the basis of acoustic signals, may be widely known.

The result display unit 21 may display the identification result calculated by the identification unit 20 and the direction θ of the sound source estimated by the position estimation unit 16. How to display the identification result and the direction θ of the sound source may be arbitrary. The result display unit 21 may display the position of the sound source specified by the direction θ of the sound source and the contents of an identified acoustic event.

The identification unit 20 may be realized by the CPU of a computer that runs in accordance with a software program. In some aspects, the result display unit 21 may be realized by, for example, a display device, or the like. The result display unit 21 may be configured in such a way that the result display unit 21 is realized by the CPU of a computer that runs in accordance with a software program, and instruct another display device to perform display processing.

In some aspects, the vibration source estimation device may not include a display device. In this case, the result display unit 21 may instruct the display device to display an identified result identified by the identification unit 20 and the direction θ of a sound source estimated by the position estimation unit 16. A system including the vibration source estimation device and the display device in this way may be referred as an acoustic monitoring system.

As described above, in some embodiments, the result display unit 21 may display both identified result identified by the identification unit 20 and direction θ of a sound source. Therefore, embodiments of the present disclosure may have an advantageous effect that the status of a sound source can be promptly grasped. Therefore, for example, an observer can rush to the site and immediately take measures to check the situation and the like on the basis of a displayed result.

THIRD EXAMPLE

Figure 5:
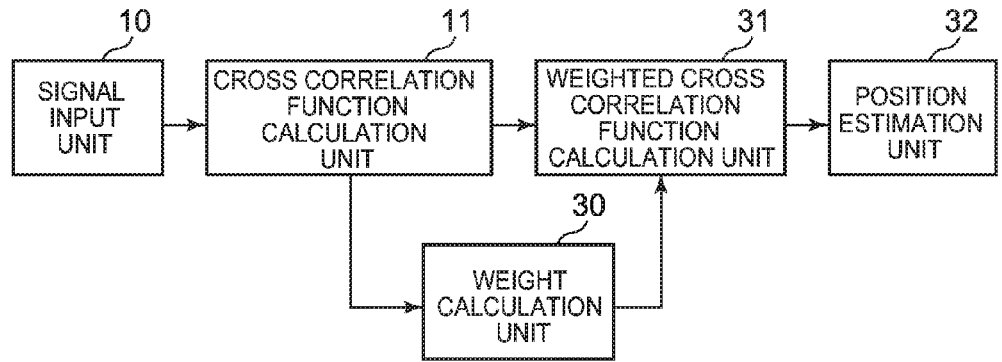
FIG. 5 is a block diagram illustrating an exemplary vibration source estimation device according to embodiments of the present disclosure.

FIG. 5 is a block diagram illustrating an exemplary vibration source estimation device. Components that are the same as those of the first example are given the same reference symbols illustrated in FIG. 1.

The exemplary vibration source estimation device of FIG. 5 may include a signal input unit 10, a cross correlation function calculation unit 11, a weight calculation unit 30, a weighted cross correlation function calculation unit 31, and a position estimation unit 32. In some aspects, the vibration source estimation device 500 may include the weight calculation unit 30, the weighted cross correlation function calculation unit 31, and position estimation unit 32. The contents of the signal input unit 10 and the cross correlation function calculation unit 11 may be the same as those of the first example.

As is the case with the weight calculation unit 14 of the first example, the weight calculation unit 30 may calculate a weight for each frame on the basis of a signal-to-noise ratio calculated from a cross correlation function. In some aspects, the weight calculation unit 30 may calculate weights $w(i)$ for cross correlation functions $c(i, \tau_s)$ for l frames calculated by the cross correlation function calculation unit 11 so that, in the case where a signal-to-noise ratio (SNR) for a frame is higher, the weight $w(i)$ for the frame is set larger, where $k-l+1 \leq i \leq k$.

A signal described in this disclosure may include a signal that is continuous and has small time changes in its power and frequency characteristics. Examples of a signal described in this disclosure may include a leakage sound from pipes. In some aspects, a noise described in this disclosure may include a burst noise other than the leakage sound.

Across correlation function generated from a signal such as a leakage sound may become constant regardless of frames. Therefore, the weight calculation unit 30 may calculate an SNR using the above-described Expression 12 with the numerator of its right-hand side set to 1 (refer to the following Expression 16).

$$SN(i) = \frac{1}{\sum_{\tau_s} |c(i, \tau_s)|^2} \qquad \text{(Expression 16)}$$

The weight calculation unit 30 may calculate a weight for each frame using, for example, any of the above-described Expressions 10 to 13.

The weighted cross correlation function calculation unit 31 may calculate a weighted-cross-correlation function by multiplying the cross correlation function which is calculated by the cross correlation function calculation unit 11, by the relevant weight calculated by the weight calculating unit 30. The weighted cross correlation function calculation unit 31 may calculate the weighted-cross-correlation function using, for example, the following Expression 17.

$$c_w(k,\tau_s) = \sum_{i=k-l+1}^{k} w(i) c(i,\tau_s) \qquad \text{(Expression 17)}$$

The position estimation unit 32 may estimate the position of a vibration source on the basis of the calculated weighted-cross-correlation function. For example, if the weighted-cross-correlation function denoted by the above-described Expression 17 is calculated, the position estimation unit 32 may estimate a distance to the sound source using the number of lag samples $\tau_s (=\Gamma_s)$ that makes the weighted cross correlation function $c_w(k, \tau_s)$ the maximum. In the estimation of the direction of a sound source, the number of lag samples $\tau_s$ may correspond to the distance of the sound source.

Figure 6:
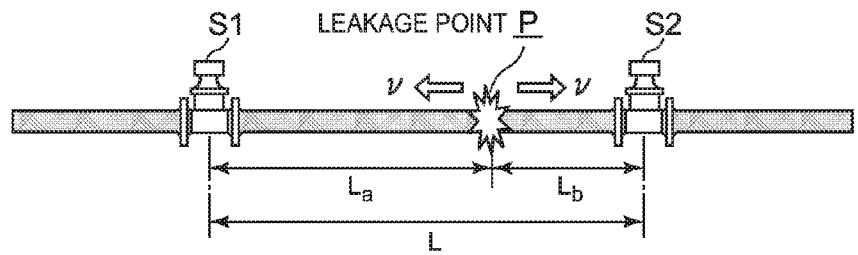
FIG. 6 is an explanatory diagram illustrating an example of the positional relation of two vibration sensors installed on a pipe and a sound source that can be determined by embodiments of the present disclosure.

FIG. 6 is an explanatory diagram illustrating an example of the positional relation of two vibration sensors installed on a pipe and a sound source. A distance $L_a$ from a leakage point P to the sensor S1 may be given by the following Expression 18 when the number of lag samples $r_s$ of a leakage sound to the sensors S1 and S2 is used. A distance $L_b$ from the leakage point P to the sensor S2 may be given by the following Expression 19.

In Expression 18 and Expression 19, L may represent a distance between the sensor S1 and the sensor S2, and v may represent a velocity at which the leakage sound travels along the pipe.

$$L_a=(L-\Gamma_s v)/2 \quad \text{(Expression 18)}$$

$$L_b=L-L_a \quad \text{(Expression 19)}$$

The signal input unit 10, the cross correlation function calculation unit 11, the weight calculation unit 30, the weighted cross correlation function calculation unit 31, and the position estimation unit 32 may be realized by the CPU of a computer that runs in accordance with a software program. In some aspects, the signal input unit 10, the cross correlation function calculation unit 11, the weight calculation unit 30, the weighted cross correlation function calculation unit 31 and the position estimation unit 32 may also be realized by respective dedicated hardware devices including logic gates and flip-flops.

Figure 7:
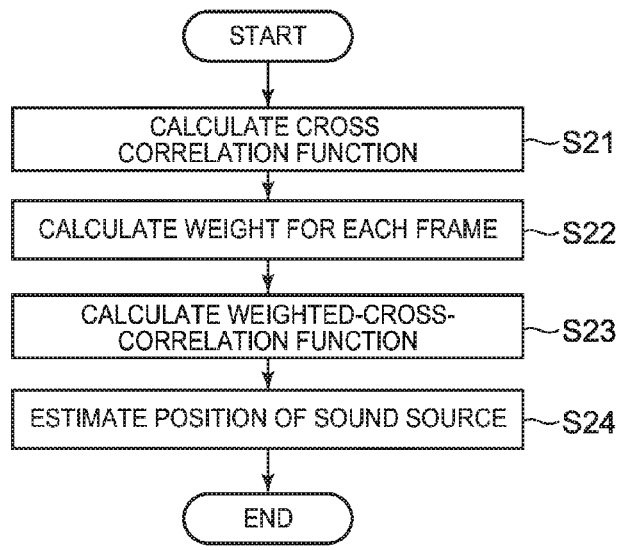
FIG. 7 is a flowchart illustrating an exemplary vibration source estimation method according to embodiments of the present disclosure.

FIG. 7 is a flowchart illustrating an exemplary vibration source estimation method. In some embodiments, the exemplary method of FIG. 7 can be performed by the exemplary vibration source estimation device of FIG. 5.

In step S21, the cross correlation function calculation unit 11 may calculate a cross correlation function for each frame using input signals. In step S22, the weight calculation unit 30 may calculate a weight for each frame on the basis of a signal-to-noise ratio calculated from the cross correlation function. In step S23, the weighted cross correlation function calculation unit 31 may calculate a weighted-cross-correlation function by multiplying the cross correlation function which is calculated by the cross correlation function calculation unit 11, by the calculated weight. In step S24, the position estimation unit 32 may estimate the position of a sound source on the basis of the calculated weighted-cross-correlation function.

As described above, the cross correlation function calculation unit 11 may calculate a cross correlation function for each frame from vibration signals, and the weight calculation unit 30 may calculate a weight for each frame on the basis of a signal-to-noise ratio calculated from the cross correlation function. The weighted cross correlation function calculation unit 31 may multiply the cross correlation function for each frame by the relevant weight, and calculate the summation of the weighted cross correlation functions for respective frames as a weighted-cross-correlation function, and the position estimation unit 32 may estimate the position of a vibration source on the basis of the weighted-cross-correlation function.

Using such a configuration as above, may also be possible to precisely estimate the position of a target vibration source. For example, the position of a signal that is continuous and has a small time change, such as a leakage sound from a pipe or the like, can be precisely estimated.

FOURTH EXAMPLE

Hereinafter, although the present disclosure will be described with reference to a concrete example, the scope of the present disclosure may not be limited to contents that will be described below. It is assumed that, when a noise and a target sound are generated from two respective directions different from each other in a rectangular cuboid room (6×6×3 m$^3$), signals observed by two MICs are calculated by a simulation using the method of images. It is assumed that the noise and the target sound are respective uncorrelated white noises, and they are generated for 0.3 second.

It is assumed that weights are calculated using the above-described Expression 13 and h is determined so that the above-described Expression 11 is satisfied. It is assumed that a distance between a first MIC and the sound source of the target sound is 3.4 m, a distance between the first MIC and the noise source is 3.0 m, a distance between the two MICs is 10 cm, a reverberating time is 0.3 second, and a sampling frequency is 48 kHz.

Figure 8:
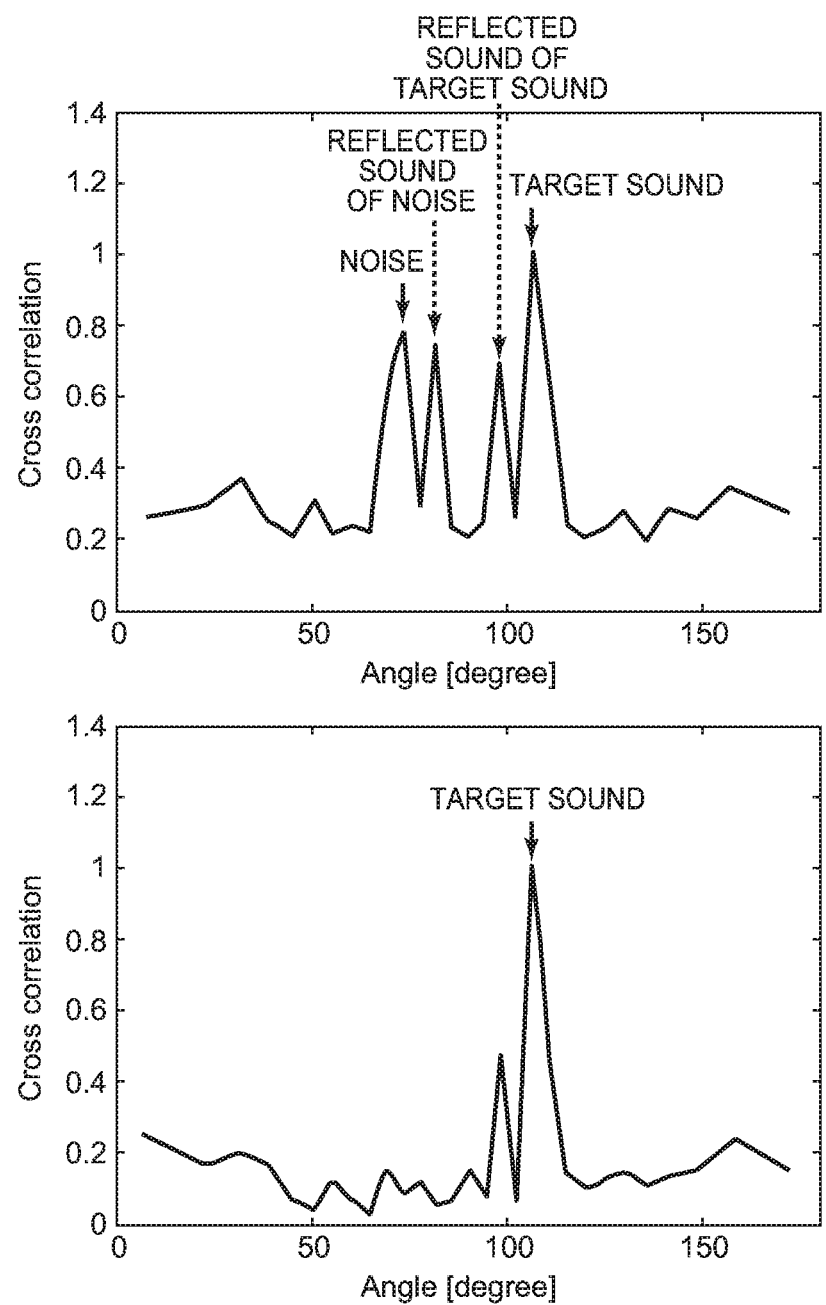
FIG. 8 is an explanatory diagram illustrating comparative examples of cross correlation functions.

FIGS. 8A and 8B are explanatory diagrams illustrating comparative examples of cross correlation functions. FIG. 8A is a figure illustrating a cross correlation function between the two signals, and FIG. 8B is a figure illustrating a weighted-cross-correlation function between the two signals. The horizontal axis of FIG. 8A or FIG. 8B represents a transmission time difference τ that is converted into a direction θ using the above-described Expression 4.

Four respective peaks illustrated in FIG. 8A represent the components of the noise, the reflected sound of the noise, the target sound, and the reflected sound of the target sound. In the case of estimating the direction of the sound source from the peaks of the cross correlation function illustrated in FIG. 8A, because there are peaks other than the peak of the target sound, there may be a high possibility that an erroneous direction is estimated.

In some aspects, if weighting is performed using the calculated weights, because, as illustrated in FIG. 8B, the peaks of the noise and the reflection sound of the noise disappear, and the peak of the reflection sound of the target sound also becomes smaller, the peak of the target sound may relatively become higher. Therefore, the direction of the sound source can be accurately estimated by estimating the direction of the sound source from the peaks of the weighted cross correlation function illustrated in FIG. 8B.

Figure 9:
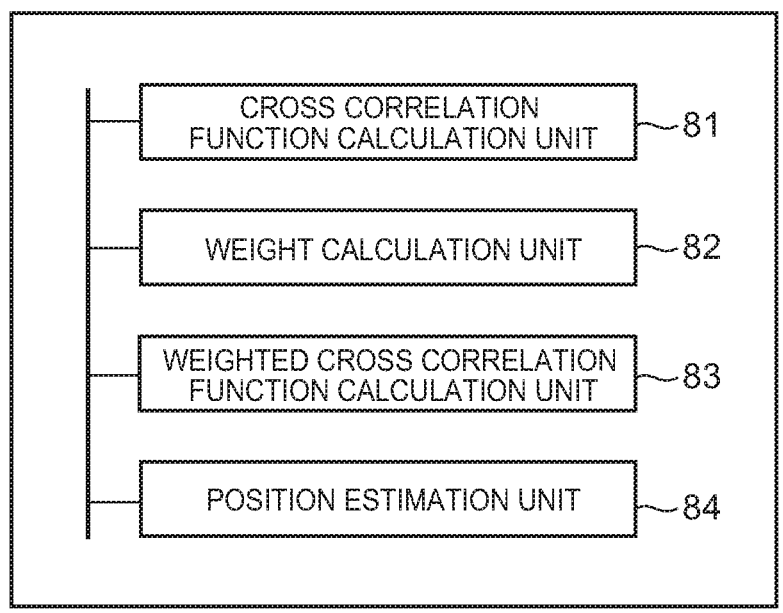
FIG. 9 is a block diagram illustrating the outline of an exemplary vibration source estimation device.

The outline of the present disclosure will be described. FIG. 9 is a block diagram illustrating the outline of the vibration source estimation device. The vibration source estimation device may be a vibration source estimation device for estimating the position of a vibration source (for example, a sound source) using plural vibration signals (for example, plural sounds) obtained by plural sensors (for example, plural MICs), and may include: a cross correlation function calculation unit 81 (for example, the cross correlation function calculation unit 11) for calculating a cross correlation function for each frame using the vibration signals; a weight calculation unit 82 (for example, the weight calculation unit 30) for calculating a weight for each frame on the basis of a signal-to-noise ratio calculated from the cross correlation function; a weighted cross correlation function calculation unit 83 (for example, the weighted cross correlation function calculation unit 31) for multiplying the cross correlation function for each frame by the relevant calculated weight, and calculating the summation of weighted cross correlation functions for respective frames as a weighted-cross-correlation function; and a position estimation unit 84 (for example, the position estimation unit 32) for estimating the position of the vibration source on the basis of the weighted-cross-correlation function.

Owing to the above-described configuration, the position of a target vibration source can be precisely estimated even in environments where vibrations are transmitted by reflections or environments where vibrations are generated from various vibration sources other than the target vibration source.

In some aspects, the vibration source estimation device may include: a background noise model calculation unit (for example, the background noise model calculation unit 12) for calculating a background noise model that models a background noise using a cross correlation function; and a noise subtraction unit (for example, the noise subtraction unit 13) for calculating a noise-subtracted cross correlation function obtained by subtracting the background noise specified by the background noise model from the cross correlation function. In some aspects, the weighted cross correlation function calculation unit 83 (for example, the weighted cross correlation function calculation unit 15) may calculate a weighted-cross correlation-unction using noise-subtracted cross correlation functions instead of cross correlation functions. In some aspects, the weighted cross correlation function calculation unit 83 may multiply the noise-subtracted cross correlation function for each frame by the relevant calculated weight, and calculate the summation of the weighted noise-subtracted cross correlation functions for respective frames as a weighted-cross-correlation function.

In some aspects, when a signal power is regarded as the square of the maximum value of the cross correlation function, and a signal noise power is regarded as the sum of squares of the cross correlation function, the weight calculation unit 82 may calculate a weight for each frame on the basis of a signal-to-noise ratio calculated by dividing the signal power by the signal noise power (for example, a signal-to-noise ratio calculated using the above-described Expression 12).

In other aspects, when a signal noise power is regarded as the sum of squares of the cross correlation function, the weight calculation unit 82 may calculate a weight for each frame on the basis of a signal-to-noise ratio calculated using the reciprocal of the signal noise power (for example, a signal-to-noise ration calculated using the above-described Expression 16).

In other aspects, the position estimation unit 84 may estimate the position of the vibration source by estimating directions or distances from the sensors (refer to, for example, the above-described Expression 15, or the above-described Expression 18 and Expression 19) on the basis of a lag time that makes the weighted-cross-correlation function the maximum, distances between the sensors, and a vibration transmission velocity.

In other aspects, the cross correlation function calculation unit 81 may calculate the imaginary part of the cross correlation function from the real part of the cross correlation function, and regard a complex number obtained by adding the real part and the imaginary part (refer to the above-described Expression 2 or Expression 3, for example) as a cross correlation function.

In other aspects, the weight calculation unit 82 may calculate a larger weight for a frame as the signal-to-noise ratio of the cross correlation function of the frame is higher.

In other aspects, the vibration source estimation device may include an identification unit (for example, the identification unit 20) for identifying a kind of distinguishable acoustic event on the basis of a sound; and a result display unit (for example, the result display unit 21) for issuing instructions to display the identified kind of acoustic event and the estimated direction of the sound source. Owing to the above-described configuration, the status of the sound source can be immediately grasped.

The present disclosure may be applied to a vibration source estimation device for estimating the position of a vibration source. The present disclosure may be applied to a vibration source estimation device that is capable of precisely estimating the position of a sound source, for example, even in environments where noises and reflection sounds are generated when the direction of a sound source is estimated in a room.

Although the present disclosure has been described above with reference to each example, the present disclosure is not limited to the above-described examples. Various alternations that can be understood by a person skilled in the art can be made to the configurations and the details of the present disclosure as long as such alternations fall within the scope of the present disclosure.

The invention claimed is:

1. A vibration source estimation device, comprising:
a memory storing instructions; and
at least one processor configured to process the instructions to:
receive data samples of a plurality of vibration signals generated at a vibration position, the data samples being associated with a plurality of frames,
calculate a cross correlation function for each frame based on the data samples,
calculate a background noise model that models background noise using the cross correlation function,
calculate a noise-subtracted cross correlation function by subtracting the background noise, determined by the background noise model, from the cross correlation function,
calculate a weight for each frame based on a signal-to-noise ratio calculated from the noise-subtracted cross correlation function,
multiply the noise-subtracted cross correlation function by the weight to be a weighted cross correlation function for each frame,
calculate a sum of weighted cross correlation functions for the plurality of frames as a weighted-cross-correlation function, and
estimate the vibration position based on the weighted-cross-correlation function.

2. The vibration source estimation device according to claim 1, wherein the at least one processor is configured to process the instructions to:
calculate a square of the maximum value of the noise-subtracted cross correlation function as a signal power,
calculate a sum of squares of the noise-subtracted cross correlation function as a signal noise power, and
calculate the signal-to-noise ratio by dividing the signal power by the signal noise power.

3. The vibration source estimation device according to claim 1, wherein the at least one processor is configured to process the instructions to:
calculate the sum of squares of the noise-subtracted cross correlation function as the signal noise power, and
calculate the signal-to-noise ratio using a reciprocal of the signal noise power.

4. The vibration source estimation device according to claim 1, wherein the at least one processor is configured to process the instructions to estimate the vibration position by:
estimating directions or distances from sensors which obtain the plurality of vibration signals based on:
a lag time that makes the weighted-cross-correlation function the maximum,
distances between the sensors, and
a vibration transmission velocity.

5. The vibration source estimation device according to claim 1, wherein the at least one processor is further configured to process the instructions to:

calculate an imaginary part from the cross correlation function, form a complex cross correlation function containing a real part and the imaginary part, the real part being the cross correlation function, and regard the complex cross correlation function as the cross correlation function.

6. The vibration source estimation device according to claim 1, wherein the weight for each frame is monotonically increasing with respect to the signal-to-noise ratio of the cross correlation function.

7. The vibration source estimation device according to claim 1, wherein the at least one processor is further configured to process the instructions to:

identify an acoustic event based on a sound included in at least any one of the plurality of the vibration signals; and display information about the acoustic event and an estimated direction of a source of the sound.

8. A vibration source estimation method, comprising:

receiving data samples of a plurality of vibration signals generated at a vibration position, the data samples being associated with a plurality of frames;

calculating a cross correlation function for each frame based on the data samples;

calculate a background noise model that models background noise using the cross correlation function;

calculate a noise-subtracted cross correlation function by subtracting the background noise, determined by the background noise model, from the cross correlation function;

calculating a weight for each frame based on a signal-to-noise ratio calculated from the noise-subtracted cross correlation function;

multiplying the noise-subtracted cross correlation function by the weight to be a weighted cross correlation function for each frame;

calculating a sum of weighted cross correlation functions for the plurality of frames as a weighted-cross-correlation function; and estimating the vibration position based on the weighted-cross-correlation function.

9. The vibration source estimation method according to claim 8, further comprising:

calculating a square of the maximum value of the noise-subtracted cross correlation function as a signal power;

calculating a sum of squares of the noise-subtracted cross correlation function as a signal noise power; and calculating the signal-to-noise ratio by dividing the signal power by the signal noise power.

10. The vibration source estimation method according to claim 8, further comprising:

calculating the sum of squares of the noise-subtracted cross correlation function as the signal noise power, and calculating the signal-to-noise ratio using a reciprocal of the signal noise power.

11. The vibration source estimation method according to claim 8, wherein estimating the vibration position includes estimating directions or distances from sensors which obtain the plurality of vibration signals based on:

a lag time that makes the weighted-cross-correlation function the maximum, distances between the sensors, and a vibration transmission velocity.

12. The vibration source estimation method according to claim 8, further comprising:

identifying an acoustic event based on a sound included in at least any one of the plurality of the vibration signals; and displaying information about the acoustic event and an estimated direction of a source of the sound.

13. A non-transitory computer-readable storage medium storing instructions that, when executed by a computer, cause the computer to perform a method, the method comprising:

receiving data samples of a plurality of vibration signals generated at a vibration position, the data samples being associated with a plurality of frames;

calculating a cross correlation function based on the data samples;

calculating a background noise model that models background noise using the cross correlation function;

calculating a noise-subtracted cross correlation function by subtracting the background noise, determined by the background noise model, from the cross correlation function;

calculating a weight for each frame based on a signal-to-noise ratio calculated from the noise-subtracted cross correlation function;

multiplying the noise-subtracted cross correlation function by the weight to be a weighted cross correlation function for each frame;

calculating a sum of weighted cross correlation functions for the plurality of frames as a weighted-cross-correlation function; and estimating the vibration position based on the weighted-cross-correlation function.

14. The non-transitory computer-readable storage medium according to claim 13, wherein the method further comprises:

calculating a square of the maximum value of the noise-subtracted cross correlation function as a signal power;

calculating a sum of squares of the noise-subtracted cross correlation function as a signal noise power; and calculating the signal-to-noise ratio by dividing the signal power by the signal noise power.

15. The non-transitory computer-readable storage medium according to claim 13, wherein the method further comprises:

calculating the sum of squares of the noise-subtracted cross correlation function as the signal noise power, and calculating the signal-to-noise ratio using a reciprocal of the signal noise power.

16. The non-transitory computer-readable storage medium according to claim 13, wherein estimating the vibration position includes estimating directions or distances from sensors which obtain the plurality of vibration signals based on:

a lag time that makes the weighted-cross-correlation function the maximum, distances between the sensors, and a vibration transmission velocity.

17. The non-transitory computer-readable storage medium according to claim 13, wherein the method further comprises:

identifying an acoustic event based on a sound included in at least any one of the plurality of the vibration signals; and displaying information about the acoustic event and an estimated direction of a source of the sound.

* * * * *